United States Patent Office 2,943,095
Patented June 28, 1960

2,943,095
PROCESS FOR PREPARING GLYCIDYL POLYETHERS OF POLYHYDRIC PHENOLS

Alford G. Farnham, Caldwell, Leon Schechter, Summit, and John Wynstra, Berkeley Heights, N.J., assignors to Union Carbide Corporation, a corporation of New York No Drawing. Filed June 28, 1955, Ser. No. 518,674

11 Claims. (Cl. 260—348.6)

This invention relates to the production of essentially monomeric glycidyl polyethers of polyhydric polynuclear phenols. In particular, it relates to the diglycidyl ethers of bisphenols having a high percentage of epoxy content and a method for preparing them in almost theoretical yield.

The usual preparation of glycidyl ethers of phenols involves the reaction of epichlorohydrin with a phenol in the presence of an alkali. Illustrative of the preparation of a monomeric glycidyl ether is the reaction between epichlorohydrin and di-(4-hydroxy phenyl) dimethyl methane, commonly referred to as Bisphenol A. The reaction can be represented by the following equations.

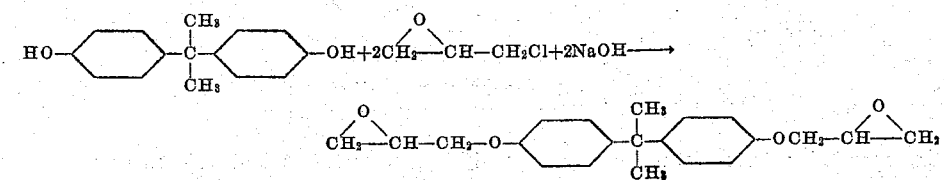

While according to this equation a mol of epichlorohydrin is required for each phenolic hydroxyl group, it has been previously shown that if these equivalent ratios are employed the yield of diglycidyl ethers generally will not exceed 10 percent and the remaining 90 percent of the resultant reaction product will comprise high molecular weight resinous polymers and condensation products.

To obtain higher yields of diglycidyl ethers, therefore, it has been proposed to use the epichlorohydrin in considerable excess corresponding to from two to three times the equivalent ratios. By this means it has been reported that yields of diglycidyl ethers as high as 70 percent have been obtained.

It has also been proposed to increase the yield of diglycidyl ethers by employing substantially the stoichiometric amount of alkali to neutralize the hydrogen chloride released in the etherification reaction and to avoid any excess since this tends to increase side reactions. Also, the presence of an excess of alkali in the reaction products after the completion of the reaction causes further reactions such as condensation and polymerization to occur. Further, it has been proposed to add the alkali during the course of the reaction in amounts small enough to maintain the reaction solution at an alkalinity of less than that which colors phenolphthalein.

While these proposals have an alleged increased yield of diglycidyl ethers, they are deficient in the respect that at most only about 80 percent recovery of the excess epichlorohydrin is possible and also for the reason that the diglycidyl ethers constitute only from 50 to 70 percent of the reaction products obtained.

Now we have found that the difficulties inherent in the formerly proposed processes can be obviated and it is one of the objects of this invention to provide a method whereby practically 100 percent recovery of the excess epichlorohydrin can be effected. It is another object of this invention to provide a method for the preparation of a reaction product of epichlorohydrin and a polynuclear polyhydric phenol which contains about 85 percent or more of monomeric polyglycidyl derivative. Still other objects and advantages will be apparent from the following description of the invention.

Our invention is based on the discovery that the reaction of epichlorohydrin with a polynuclear polyhydric phenol is advantageously carried out in two stages; the first stage leading to the preparation of the chlorohydrin ether of the polynuclear phenol, and the second stage involving the dehydrochlorination of the chlorohydrin ether with the formation of the glycidyl ether. These two stages of the reaction can be represented as follows, in which —ROH is a fragment of a polyhydric phenol and MOH a metallic base.

FIRST STAGE

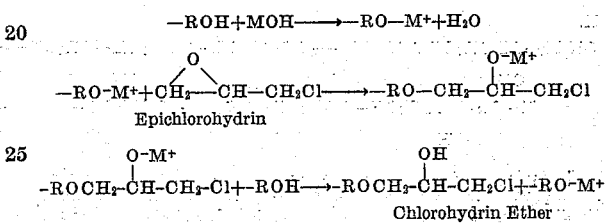

SECOND STAGE

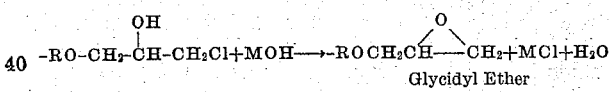

It will be noted from these equations that the alkali serves a dual purpose. In the first stage it catalyzes the addition of the epichlorohydrin to the phenol, forming a phenoxide ion which is continuously regenerated. In the second stage the alkali serves to dehydrochlorinate the chlorohydrin to the glycidyl ether and for this purpose the stoichiometric quantity of alkali is required.

Now we have found that the formation of undesirable higher condensation products can be avoided by carrying out the first stage in such manner that substantially all the phenol is converted to its chlorohydrin ether before proceeding with dehydrochlorination. Control of the first stage reaction to effect such a result is conjointly dependent upon the reaction temperature and upon the concentration in the reaction solution of bases, or of salts capable of base formation in the presence of epichlorohydrin. In general the concentration of base or of base-forming salt in the reaction mixture throughout the first stage of reaction should be sufficient, at least, to color phenolphthalein. On the other hand, concentrations of base exceeding 0.25 equivalent per phenolic hydroxyl group are undesirable in that yields of the desired monomeric glycidyl ether tend to be lower and with an attendant increase of higher molecular weight reaction products. Preferably, the base or base-forming salt is employed in concentrations of between 0.02 and 0.1 equivalent per phenolic hydroxyl group.

We have further found that the first stage reaction should be conducted at temperatures not in excess of 45° C. and preferably at reaction temperatures below 35° C., since the lower the reaction temperature, the higher has been the ultimate yield of monomeric glycidyl ethers, although the reaction time is thereby increased to a week or more, for example at 20° C.

By the present process of initially converting practically all the phenol reactant to its chlorohydrin ether, subsequent formation of undesired higher molecular weight by-products is substantially avoided. In comparison with our process, other processes heretofore suggested for preparing monomeric glycidyl polyethers, employed reaction conditions and amounts of base causing early formation of glycidyl polyethers which being in admixture with unreacted phenol and chlorohydrin epoxy ethers reacted therewith to form undesired higher molecular weight by-product reaction products, as illustrated in the subsequent equations.

I.

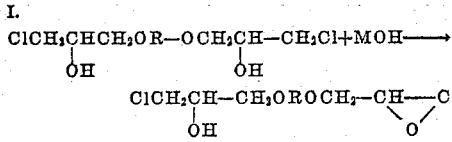

II.

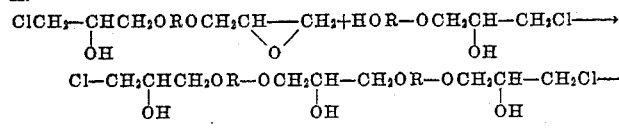

Equation I illustrates the partial dehydrochlorination of the chlorohydrin ether with the formation of a glycidyl ether. Equation II illustrates how this glycidyl ether can then react with a dihydric phenol in which only one hydroxyl has reacted with epichlorohydrin, i.e., a phenol which has only partially undergone the first stage reaction. Such a reaction leads to polymeric impurities from which the monomeric glycidyl ethers can be isolated only with difficulty if at all.

Moreover, by thus effecting completion of the formation of the chlorohydrin ether it was found possible to remove excess epichlorohydrin by distillation or otherwise before proceeding to the second stage. This is desirable since to effect the dehydrochlorination step, additional alkali is required and if the excess epichlorohydrin is allowed to remain in the reaction mixture during the second stage it tends to react with alkali to form glycerine according to the following reaction.

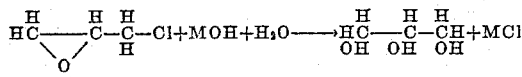

This can result in a considerable loss of epichlorohydrin and consequently this loss is avoided if the excess epichlorohydrin has been removed.

However, it was found that another side reaction occurred in the first stage in which the chlorohydrin ether reacted with the epichlorohydrin to form glycerol dichlorohydrin. This can be represented as follows.

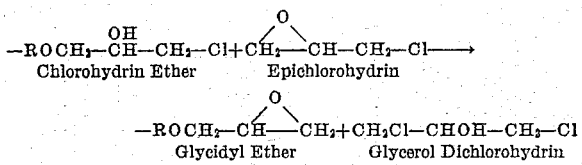

The formation of the glycerol dichlorohydrin is disadvantageous since it is higher boiling than the epichlorohydrin and thus higher temperatures are required for its recovery. These higher temperatures in turn tend to bring about further side reactions which mitigate against the purity of the glycidyl ether. Moreover, the glycerol dichlorohydrin must be converted back to epichlorohydrin before it can be recycled to the process.

Now it has been found possible to avoid this reconversion step by adding a sufficient amount of base at the end of the first stage of the reaction to convert the glycerol dichlorohydrin to epichlorohydrin. This can be represented as follows.

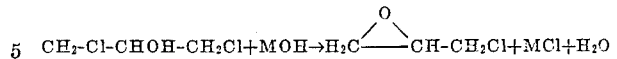

The amount required to effect this reconversion was found to be from 50–70 percent of the stoichiometric amount required for complete dehydrochlorination. It was further found that if this amount of alkali is added following the completion of the first stage, thus effecting a partial dehydrochlorination, after which the excess epichlorohydrin is distilled off, any glycerol dichlorohydrin present in the reaction mixture will be converted to epichlorohydrin and practically 100 percent recovery of the excess epichlorohydrin can be accomplished. Following the removal of the epichlorohydrin, sufficient base is added to complete the dehydrochlorination.

Completion of the dehydrochlorination of the chlorohydrin ether, it has been found, is effectively performed in a mixture of liquids which comprises (1) a volatile water-soluble alcohol or ketone such as ethyl alcohol, isopropanol, acetone and methyl ethyl ketone which is a solvent for the chlorohydrin ether and the aqueous solution of the alkali, and (2) a water-insoluble liquid, for example hydrocarbons such as toluene which are non-solvent for the aqueous solution of the alkali but a solvent for the glycidyl ether formed by the dehydrochlorination. By the use of such a mixture of water-soluble and water-insoluble liquids the base can not readily attack the glycidyl ether to yield hydrolyzed or partially polymerized material as is the case when only a water-soluble liquid, e.g. ethyl alcohol is used which is a solvent for all three components of the reaction mixture. On the other hand, if only a water-insoluble liquid is used such as toluene, the rate of dehydrochlorination is too slow to be practical.

The second stage of the reaction requires a stoichiometric quantity of base and it has been found advantageous to employ up to about five percent in excess of this amount in order to insure complete dehydrochlorination. It is not necessary that the alkali additions during the second stage be made slowly, e.g. dropwise, rather they may be made quite rapidly. The rapidity of the dehydrochlorination reaction is dependent upon temperature, a temperature of 50–60° C. being ordinarily used.

On completion of dehydrochlorination any excess of alkali is neutralized with a weak acid such as boric acid and the salts removed either by filtration or centrifugation. The water layer is separated away from the organic layer containing the glycidyl ether from which the solvents are removed by distillation in vacuo. Instead of neutralizing the excess alkali, it can also be removed as by washing with a suitable solvent, such as water.

The dihydric phenols preferred for employment in the present invention are polyhydric aromatic compounds with separated rings such as di-(4-hydroxy phenyl) methane and di-(4-hydroxy phenyl) dimethyl methane and the like as described in Bender et al. U.S. Patent No. 2,506,486 for the preparation of diglycidyl ethers.

Bases suitable for employment as catalysts for the first stage are the water-soluble alkalies such as sodium hydroxide, potassium hydroxide, and lithium hydroxide. Of these lithium hydroxide or its salts is preferred as a catalyst for the first stage since its use favors the formation of the chlorohydrin ether and tends to prevent premature formation of the glycidyl ether. As a result, glycidyl ethers of higher epoxy assay are obtained by its use compared to those glycidyl ethers prepared using sodium or potassium hydroxide. Water-soluble salts of lithium such as lithium chloride and lithium acetate may be employed instead of the hydroxide. The preferred amounts of lithium hydroxide or its salt to catalyze the first stage reaction are about 0.02 to 0.04 equivalent per phenolic hydroxyl group. The lithium catalysts are generally added in the form of aqueous solutions of about 10 percent concentration.

The bases suitable for dehydrochlorination are the water-soluble bases previously listed as catalysts. For this purpose there is no advantage in the use of lithium hydroxide over the more available sodium and potassium hydroxides. For dehydrochlorination the alkalies are used in an amount in about five percent in excess of the stoichiometric amount required. It has been found that this amount of excess is required to insure complete dehydrochlorination. This slight excess is conveniently neutralized with a weak acid such as boric acid on completion of dehydrochlorination. By so doing, it has been found that the glycidyl ether reaction product need not be water washed to remove any excess base.

The amount of epichlorohydrin employed in the present invention is from two to three times the number of molar equivalents required. A larger excess may be employed but results in little improvement in the yield of glycidyl ethers. The amount of excess employed is dependent in part on the catalyst and the reaction temperature employed in the first stage. With lithium hydroxide as the catalyst and a reaction temperature of about 30–35° C. an amount of epichlorohydrin twice the molar equivalent yielded products having epoxy contents as high as 87 percent and by the use of an amount of epichlorohydrin three times the molar equivalent and under similar reaction condition glycidyl ethers were obtained having an epoxy content between 95 and 96 percent.

The first stage of the process is conducted by dissolving a mixture of polyhydric polynuclear phenol, e.g. bisphenol, and epichlorohydrin in enough solvent, e.g. alcohol to form a fluid solution and adding the catalyst in about ten percent aqueous solution. The mixture is reacted at temperature of about 35° C. or lower. The time required to complete the first stage reaction is about 72 hours at a reaction temperature of 30° C., using a catalyst concentration of about 0.04 equivalent per phenolic hydroxyl.

After completion of the first stage of the process, which is indicated by the substantial absence of phenolic groups in the reaction mixture when tested by Millon's reagent, the mixture is usually heated to about 55–65° C. and about 50–70 percent of the base required for dehydrochlorination is added.

After addition of this amount of base the epichlorohydrin is distilled off under vacuum 10–20 mm. Hg to a residue temperature of about 90–95° C. The residue is then dissolved in a mixture of solvents, for example ethanol and toluene. The amount of solvent used is ordinarily about 70–75 percent by weight of the charged quantities of epichlorohydrin and polyhydric phenol. The ratio of solvents is preferably about three parts by weight of toluene to one part by weight of ethanol. Instead of toluene, benzene may be employed and instead of ethanol, methanol, acetone or methyl ethyl ketone are suitable. The ratio of solvents may be varied between 2½ to 3½ parts of water-insoluble solvent to one of water-soluble solvent.

To the residue solution is then gradually added the remainder of the alkali required for dehydrochlorination, the temperature being maintained at about 55–65° C. After completion of the dehydrochlorination, which requires about ¾ to 1¼ hours, sufficient boric acid is added to neutralize the excess alkali. The reaction mixture is then filtered or centrifuged to remove the salt, and the filtrate transferred to a separator where the lower water layer is drawn off and the upper organic layer containing the glycidyl ether is stripped of solvent by distillation under vacuum of 10–20 mm. Hg. to a residue temperature of 125° C. The residue constitutes the desired glycidyl ether. It is analyzed for epoxy content by heating one gram in an excess of pyridine containing pyridine hydrochloride (made by adding 16 cc. of concentrated hydrochloric acid per liter of pyridine) at the boiling point for twenty minutes and back titrating the excess pyridine hydrochloride with 0.1 N sodium hydroxide using phenolphthalein as indicator and considering that one mole of the HCl is equivalent to one epoxide group. The result is usually expressed as an epoxy equivalent weight which means weight of product that contain an equivalent of epoxide. Of it may be expressed as an epoxy content which is the percent of theoretical epoxy and can be calculated by dividing the equivalent weight of the pure glycidyl ether by the epoxy equivalent weight. For example the equivalent weight of the diglycidyl ether of di-(4-hydroxy phenyl) dimethyl methane is equal to one half the molecular weight (340) or 170. A reaction product having an epoxy equivalent weight of 178, would have an epoxy content of $$\frac{170}{178} = 95.5\%$$

The following examples further illustrate the process of this invention, but are not to be construed in limitation thereof except as hereinafter claimed.

Example 1

A mixture of 228 grams (1.00 mole) of di-(4-hydroxy phenyl) dimethyl methane and 55.2 grams (6.00 mole) of epichlorohydrin was dissolved in 150 grams of ethanol and 2.94 grams (.07 mole) lithium hydroxide monohydrate in ten percent aqueous solution was added. The mixture was stirred for 72 hours at a temperature of 28–32° C. Upon testing with Millon's reagent a negative test for phenolic hydroxyl groups was obtained. The temperature was then raised to 57–62° C. and a 36 percent aqueous solution of 48 grams (1.2 mole) sodium hydroxide was added during a period of ¾ hour. The mixture was maintained at this temperature for another ¼ hour and the excess epichlorohydrin distilled off under a vacuum of 10–20 mm. Hg to a residue temperature of 90–95° C. The residue was dissolved in 570 grams of a three to one toluene-ethanol mixture and to this solution was added a 50 percent aqueous solution of 36 grams (.9 mole) sodium hydroxide during a period of ¾ hour maintaining a temperature of 57–62° C. After holding at this temperature for a further ¼ hour, 12.4 grams (0.2 mole) boric acid was added in solid form and the reaction mixture stirred ¼ hour to insure neutralization. The reaction mixture was filtered and the filtrate transferred to a separatory funnel. The lower water layer, which constituted about seven percent by weight of the mixture, was drawn off and the organic layer placed in a distilling flask. The solvent was stripped from the organic layer by distilling under a vacuum of 10–20 mm. Hg to a residue temperature of 125° C. The residue was clarified by filtration using a filter aid. The clarified product had an epoxy equivalent of 178 or an epoxy content of 95.5 percent. Recovery of the excess epichlorohydrin was quantitative.

Example 2

A mixture of 200 grams (1.00 mole) of di(4-hydroxyphenyl) methane and 555.2 grams (6.00 mole) of epichlorohydrin was dissolved in 150 grams of ethanol and 2.94 grams (.07 mole) lithium hydroxide monohydrate in 10 percent aqueous solution was added. The mixture was stirred for 72 hours at a temperature of 28–32° C. At the end of this period the reaction mixture on test with Millon's reagent was negative as to phenolic hydroxyl content. The temperature of the mixture was then raised to 57–62° C. and a 36 percent aqueous solution of 48 grams (1.2 mole) sodium hydroxide was added during a period of ¾ hour. The mixture was maintained at this temperature for another ¼ hour and the epichlorohydrin distilled off under a vacuum of 10–20 mm. Hg to a residue temperature of 90–95° C. The residue was dissolved in a 570 gram three to one toluene-ethanol mixture and to this solution was added a 50 percent aqueous solution of 36 grams (.9 mole) sodium hydroxide during a period of ¾ hour maintaining a temperature of 57–62° C. After holding at this temperature for a further ¼ hour, 12.4 grams (0.2 mole) boric acid was added in solid form and the reaction mixture stirred ¼ hour to insure neutralization. The reaction mixture was filtered and the filtrate transferred to a separatory funnel. The lower water layer, which constituted about seven percent by weight of the mixture, was drawn off and the organic layer placed in a distilling flask. The solvent was stripped from the organic layer by distilling under a vacuum of 10–20 mm. Hg to a residue temperature of 125° C. The residue was clarified by filtration using a filter aid. The clarified product had an epoxy equivalent of 175 or an epoxy content of 89 percent. Ninety-eight percent of the excess epichlorohydrin was recovered.

Example 3

A mixture of 228 grams (1.0 mole) of di-(4-hydroxy phenyl) dimethyl methane and 555.2 grams (6.00 mole) of epichlorohydrin was dissolved in 150 grams of ethanol and 2.94 grams (0.07 mole) lithium chloride in 10 percent aqueous solution was added. The mixture was stirred for 72 hours at a temperature of 28–32° C. The mixture on test by Millon's reagent was negative as to phenolic hydroxyl content. The temperature of the mixture was then raised to 57–62° C. and a 36 percent aqueous solution of 48 grams (1.2 moles) sodium hydroxide was added during a period of ¾ hour. The mixture was maintained at this temperature for another ¼ hour and the epichlorohydrin distilled off under vacuum of 10–20 mm. Hg to a residue temperature of 90–95° C. The residue was dissolved in a 570 gram five to two toluene-ethanol mixture and to this solution was added a 50 percent aqueous solution of 36 grams (.9 mole) sodium hydroxide during a period of ¾ hour maintaining a temperature of 57–62° C. After holding at this temperature for a further ¼ hour, 12.4 grams (0.2 mole) boric acid was added in solid form and the reaction mixture stirred ¼ hour to insure neutralization. The reaction mixture was filtered and the filtrate transferred to a separatory funnel. The lower water layer, which constituted about seven percent by weight of the mixture was drawn off and the organic layer placed in a distilling flask. The solvent was stripped from the organic layer by distilling under vacuum of 10–20 mm. Hg to a residue temperature of 125° C. The residue was clarified by filtration using a filter aid. The clarified product had an epoxy equivalent of 185 or an epoxy content of 92 percent.

Example 4

A mixture of 228 grams (1.0 mole) of di-(4-hydroxy phenyl) dimethyl methane and 555.2 grams (6.00 mole) of epichlorohydrin was dissolved in 150 grams of ethanol and 4.0 grams (0.1 mole) sodium hydroxide in ten percent aqueous solution was added. The mixture was stirred for 72 hours at a temperature of 28–32° C., resulting in a reaction mixture exhibiting a negative test for phenolic hydroxyl group when tested with Millon's reagent. The temperature of the mixture was then raised to 57–62° C. and a 36 percent aqueous solution of 48 grams (1.2 mole) sodium hydroxide was added during a period of ¾ hour. The mixture was maintained at this temperature for another ¼ hour and the epichlorohydrin distilled off under a vacuum of 10–20 mm. Hg to a residue temperature of 90–95° C. The residue was dissolved in a 570 gram three to one toluene-ethanol mixture and to this solution was added a 50 percent aqueous solution of 36 grams (.9 mole) sodium hydroxide during a period of ¾ hour maintaining a temperature of 57–62° C. After holding at this temperature for a further ¼ hour, 12.4 grams (0.2 mole) boric acid was added in solid form and the reaction mixture stirred ¼ hour to insure neutralization. The reaction mixture was filtered and the filtrate transferred to a separatory funnel. The lower water layer, which constituted about seven percent by weight of the mixture, was drawn off and the organic layer was distilled under a vacuum of 10–20 mm. Hg to a residue temperature of 125° C. The residue was clarified by filtration using a filter aid. The clarified product had an epoxy equivalent of 184 or an epoxy content of 92.6 percent.

Example 5

A mixture of 228 grams (1.0 mole) of di-(4-hydroxy phenyl) dimethyl methane, 370 grams (4.00 moles) of epichlorohydrin and 5.78 grams of triethylamine (equivalent to one percent by weight of sodium hydroxide based on the bisphenol, was heated at 45° C. for seventeen hours. The resulting reaction product was a viscous liquid. This product was distilled at 5 to 10 mm. Hg pressure to a residue temperature of 120° C. The residue was dissolved in 300 grams ethyl alcohol and then over a period of 15 minutes at 45° to 50° C. eighty grams of sodium hydroxide dissolved in 120 grams water was added. The mixture was cooled to 25° C. and 20 grams more of sodium hydroxide dissolved in 40 grams of water was added. The mixture was stirred for ½ hour at 20–25° C. and then dissolved in benzene and transferred to a separatory funnel. The lower water layer was separated off and the upper organic layer washed with water. Some emulsification occurred, resulting in a slight loss in yield. Yield after vacuum distillation of the water-washed product was 230 grams, having an epoxy content of 79 percent.

We claim:
1. Process for the preparation of monomeric glycidyl polyethers of polyhydric polynuclear phenols which comprises reacting at a temperature not in excess of 45° C. a mixture containing a molar amount of a polyhydric polynuclear phenol and epichlorohydrin in molar amounts equivalent to at least about twice the number of phenolic hydroxyl groups in said phenol in the presence of a catalytic amount of a catalyst which generates a phenoxide ion in said reaction mixture, said catalyst being present in an amount up to 0.25 equivalent per phenolic hydroxyl group and sufficient to impart to the reaction mixture an alkalinity coloring phenol phthalein, until substantially all of the said phenol has been converted to its chlorohydrin ether, removing the unreacted epichlorohydrin from the said chlorohydrin ether and adding to said chlorohydrin ether an amount of alkali metal hydroxide sufficient to provide from about 100 to about 105 percent of the stoichiometric amount of alkali metal hydroxide required for complete dehydrochlorination of said chlorohydrin ether.

2. Process for the preparation of monomeric glycidyl polyethers of polyhydric polynuclear phenols which comprises reacting a mixture containing a molar amount of a polyhydric polynuclear phenol and epichlorohydrin in molar amount equivalent to at least about twice the number of phenolic hydroxyl groups in said phenol at a reaction temperature not in excess of about 45° C. and in the presence of a catalytic amount of an alkali metal hydroxide being between 0.02 and 0.1 equivalent per phenolic hydroxyl group until substantially all the phenol has been converted to its chlorohydrin ether, removing the unreacted epichlorohydrin from said chlorohydrin ether and adding to said chlorohydrin ether an amount of alkali metal hydroxide sufficient to provide from about 100 to about 105 percent of the stoichiometric amount of said alkali metal hydroxide required for complete dehydrochlorination of said chlorohydrin ether.

3. Process for the preparation of monomeric glycidyl polyethers of polyhydric polynuclear phenols which comprises reacting a mixture containing a molar amount of a polyhydric polynuclear phenol and epichlorohydrin in molar amounts equivalent to at least about twice the number of phenolic hydroxyl groups in said phenol in the presence of a catalytic amount of an alkali metal hydroxide not in excess of 0.25 equivalent per phenolic hydroxyl group and sufficient to impart to the reaction mixture an alkalinity coloring phenolphthalein and at a reaction temperature not in excess of 45° C., effecting substantially complete conversion of all the phenol to its chlorohydrin ether, removing the unreacted epichlorohydrin from said chlorohydrin ether and adding to said chlorohydrin ether an amount of alkali metal hydroxide sufficient to provide from about 100 to about 105 percent of the stoichiometric amount of said alkali metal hydroxide required for complete dehydrochlorination of said chlorohydrin ether and then neutralizing the excess alkali metal hydroxide.

4. Process for the preparation of monomeric glycidyl polyethers of polyhydric polynuclear phenols which comprises reacting at a temperature not in excess of 45° C. a mixture containing a molar amount of a polyhydric polynuclear phenol and epichlorohydrin in molar amounts equivalent to at least about twice the number of phenolic hydroxyl groups in said phenol in the presence of a catalytic amount of a water-soluble alkali metal hydroxide not in excess of 0.25 equivalent per phenolic hydroxyl group and sufficient to impart to the reaction mixture an alkalinity coloring phenolphthalein until substantially all the phenol has been converted to its chlorohydrin ether, removing the unreacted epichlorohydrin from the reaction mixture and adding to said mixture an amount of alkali metal hydroxide sufficient to provide from about 100 to about 105 percent of the stoichiometric amount of said hydroxide required for complete dehydrochlorination of said chlorohydrin ether.

5. Process for the preparation of monomeric glycidyl polyethers of polyhydric polynuclear phenols which comprises reacting a mixture containing a molar amount of a polyhydric polynuclear phenol and epichlorohydrin in molar amounts equivalent to at least about twice the number of phenolic hydroxyl groups in said phenol in the presence of a catalytic amount of an alkali metal hydroxide not in excess of 0.25 equivalent per phenolic hydroxyl group and sufficient to impart to the reaction mixture an alkalinity coloring phenolphthalein and at a reaction temperature not in excess of 45° C. effecting substantially complete conversion of the phenol to its chlorohydrin ether, adding to the reaction mixture an amount of alkali metal hydroxide between 50 percent and 70 percent of the stoichiometric quantity required for complete dehydrochlorination of the chlorohydrin ether, removing the unreacted epichlorohydrin from the partially dehydrochlorinated reaction mixture and then completing the dehydrochlorination by adding to the reaction mixture an additional quantity of an alkali metal hydroxide sufficient to provide from about 100 to about 105 percent of the stoichiometric amount of said hydroxide required for complete dehydrochlorination of said chlorohydrin ether.

6. Process for the preparation of monomeric glycidyl polyethers of polyhydric polynuclear phenols which comprises reacting at a temperature not in excess of 45° C. a mixture containing a molar amount of a polyhydric polynuclear phenol and epichlorohydrin in molar amount equivalent to at least about twice the number of phenolic hydroxyl groups in said phenol in the presence of a catalytic amount of a catalyst which generates a phenoxide ion in said reaction mixture, said catalyst being present in an amount up to 0.25 equivalent per phenolic hydroxyl group and sufficient to impart to the reaction mixture an alkalinity coloring phenolphthalein, until substantially all of the said phenol has been converted to its chlorohydrin ether, removing the unreacted epichlorohydrin from the reaction mixture, dehydrochlorinating the chlorohydrin ether by the addition thereto of an amount of an aqueous alkali metal hydroxide solution sufficient to provide from about 100 to about 105 percent of the stoichiometric amount of said hydroxide for completely dehydrochlorinating said chlorohydrin ether, said dehydrochlorination being conducted in a solvent mixture comprising as one component a volatile water-soluble solvent for the chlorohydrin ether and the aqueous solution of alkali metal hydroxide and selected from the group consisting of ketones and alcohols, and as the second component, a water-insoluble hydrocarbon liquid which is a non-solvent for the aqueous solution of alkali metal hydroxide and is a solvent for the glycidyl ether formed by the dehydrochlorination of the chlorohydrin ether.

7. Process according to claim 6 in which a slight excess of alkali metal hydroxide over a stoichiometric amount is used to completely dehydrochlorinate the chlorohydrin ether, and the excess of alkali metal hydroxide after completion of the dehydrochlorination is neutralized with boric acid.

8. Process for the preparation of monomeric glycidyl polyethers of polyhydric polynuclear phenols which comprises reacting a mixture containing a molar amount of a polyhydric polynuclear phenol and epichlorohydrin in molar amounts equivalent to at least about twice the number of phenolic hydroxyl groups in said phenol at a reaction temperature not in excess of about 45° C. and in the presence of a catalytic amount of a catalyst which generates a phenoxide ion in said reaction mixture, said catalyst being present in an amount up to 0.25 equivalent per phenolic hydroxyl group and sufficient to impart to the reaction mixture an alkalinity coloring phenolphthalein until substantially all the phenol has been converted to its chlorohydrin ether, adding to the reaction mixture an amount of alkali metal hydroxide between about 50 percent and about 70 percent of the stoichiometric quantity required for complete dehydrochlorination of the chlorohydrin ether, then removing the unreacted epichlorohydrin from the partially dehydrochlorinated reaction mixture, completing the dehydrochlorination by adding to the reaction mixture an additional amount of alkali metal hydroxide in aqueous solution sufficient to provide a slight excess over the stoichiometric quantity required for complete dehydrochlorination of the chlorohydrin ether, the complete dehydrochlorination being conducted in a solvent mixture comprising as one component a volatile water-soluble solvent for the chlorohydrin ether and the aqueous solution of alkali metal hydroxide and selected from the group consisting of ketones and alcohols and as the second component a water-insoluble hydrocarbon liquid which is a non-solvent for the aqueous solution of alkali metal hydroxide and is a solvent for the glycidyl ether formed by the dehydrochlorination of the chlorohydrin ether, and then neutralizing the excess alkali metal hydroxide with boric acid.

9. Process according to claim 8 in which the solvent mixture contains per part by weight of the water-soluble solvent between about 2½ and 3½ parts of the hydrocarbon liquid.

10. Process for the preparation of a monomeric glycidyl polyether of a bisphenol which comprises reacting a mixture containing a molar amount of di(4-hydroxyphenyl) dimethyl methane and at least about four moles of epichlorohydrin in the presence of a catalytic amount of water-soluble alkali metal hydroxide not in excess of 0.25 equivalent per phenolic hydroxyl group and sufficient to impart to the reaction mixture an alkalinity coloring phenolphthalein and at a reaction temperature not in excess of about 45° C., thereby effecting conversion of substantially all of said phenol to its chlorohydrin ether, partially dehydrochlorinating the reaction mixture by the addition of an alkali metal hydroxide in amount between 50 and 70 percent of the stoichiometric quantity required for complete dehydrochlorination of the chlorohydrin ether, removing the unreacted epichlorohydrin from the partially dehydrochlorinated reaction mixture and then completing the dehydrochlorination by adding to the reaction mixture an additional amount of alkali metal hydroxide sufficient to provide the stoichiometric quantity required for complete dehydrochlorination.

11. Process according to claim 10 in which the bisphenol is di-(4-hydroxy phenyl) methane.

References Cited in the file of this patent

UNITED STATES PATENTS

| | | |
|---|---|---|
| 2,467,171 | Werner et al. | Apr. 12, 1949 |
| 2,581,464 | Zech | Jan. 8, 1952 |
| 2,640,037 | Parry | May 26, 1953 |
| 2,801,989 | Farnham | Aug. 6, 1957 |
| 2,841,595 | Pezzaglia | July 1, 1958 |

OTHER REFERENCES

Lee and Neville, Epoxy Resins, pp. 1-29 (1957).